US010688442B2

(12) United States Patent
Mauter et al.

(10) Patent No.: US 10,688,442 B2
(45) Date of Patent: Jun. 23, 2020

(54) METHOD OF MAGNETICALLY ALIGNING AND CRYSTALLIZING MEMBRANE PROTEINS

(71) Applicants: CARNEGIE MELLON UNIVERSITY, Pittsburgh, PA (US); The Pennsylvania State University, University Park, PA (US)

(72) Inventors: Meagan Mauter, Pittsburgh, PA (US); Manish Kumar, University Park, PA (US)

(73) Assignees: CARNEGIE MELLON UNIVERSITY, Pittsburgh, PA (US); The Penn State Research Foundation, University Park, PA (US)

( * ) Notice: Subject to any disclaimer, the term of this patent is extended or adjusted under 35 U.S.C. 154(b) by 203 days.

(21) Appl. No.: 15/741,498

(22) PCT Filed: Jul. 5, 2016

(86) PCT No.: PCT/US2016/041006
§ 371 (c)(1),
(2) Date: Jan. 2, 2018

(87) PCT Pub. No.: WO2017/004621
PCT Pub. Date: Jan. 5, 2017

(65) Prior Publication Data
US 2018/0193802 A1     Jul. 12, 2018

Related U.S. Application Data

(60) Provisional application No. 62/231,337, filed on Jul. 2, 2015.

(51) Int. Cl.
*B01D 67/00*  (2006.01)
*B01D 69/06*  (2006.01)
(Continued)

(52) U.S. Cl.
CPC ....... *B01D 67/0004* (2013.01); *B01D 61/027* (2013.01); *B01D 69/06* (2013.01);
(Continued)

(58) Field of Classification Search
None
See application file for complete search history.

(56) References Cited

U.S. PATENT DOCUMENTS

2004/0033166 A1* 2/2004 Arnowitz ................. C30B 7/00
                                                      422/82.05
2010/0270233 A1* 10/2010 Kim .................. B01D 67/0013
                                                         210/490
(Continued)

OTHER PUBLICATIONS

Al-Haik, M.S. et al—"Molecular dynamics simulation of reorientation of polyethylene chains under a high magnetic field"—Molecular Simulation vol. 32, No. 8, Jul. 15, 2006, 601-608 (Year: 2006).*

(Continued)

*Primary Examiner* — Bradley R Spies
(74) *Attorney, Agent, or Firm* — Michael G. Monyok (57) ABSTRACT

The disclosure describes a method of forming highly ordered membrane protein crystals. The forming process is done in the presence of a magnetic field to exploit the diamagnetic anisotropy of the membrane protein. Further described is a method of magnetic alignment and crystallization of membrane proteins in two-dimensional (2D) sheets for protein structural characterization and applications in functional devices. Block co-copolymers are used in alternative embodiments to assist with the crystallization process.

12 Claims, 5 Drawing Sheets

(51) Int. Cl.
- *B01D 69/10* (2006.01)
- *B01D 69/14* (2006.01)
- *B01D 71/80* (2006.01)
- *B01D 61/02* (2006.01)
- *B01D 71/26* (2006.01)
- *B01D 71/52* (2006.01)

(52) U.S. Cl.
CPC ........... *B01D 69/10* (2013.01); *B01D 69/144* (2013.01); *B01D 71/26* (2013.01); *B01D 71/52* (2013.01); *B01D 71/80* (2013.01); *B01D 2323/35* (2013.01)

(56) References Cited

U.S. PATENT DOCUMENTS

| | | |
|---|---|---|
| 2011/0046074 A1 | 2/2011 | Kumar et al. |
| 2013/0090405 A1* | 4/2013 | Elimelech ................ C08K 7/00 522/71 |
| 2014/0051785 A1 | 2/2014 | Kumar et al. |
| 2015/0047968 A1 | 2/2015 | Elimelech et al. |

OTHER PUBLICATIONS

International Search Report and Written Opinion of the International Searching Authority for PCT Application PCT/US2016/041006 dated Sep. 23, 2016.

\* cited by examiner

METHOD OF MAGNETICALLY ALIGNING AND CRYSTALLIZING MEMBRANE PROTEINS

CROSS-REFERENCE TO RELATED APPLICATIONS

The present application is a 35 U.S.C. 371 US national phase application of PCT international application serial number PCT/US2016/41006, filed Jul. 5, 2016, which claims priority to U.S. Provisional Application Ser. No. 62/231,337, filed Jul. 2, 2015, each of which are incorporated by reference herein in their entirety.

STATEMENT REGARDING FEDERALLY SPONSORED RESEARCH

This invention was made with government support under DGE-0966227 awarded by the US National Science Foundation. The government has certain rights in this invention.

BACKGROUND OF THE INVENTION

This invention relates generally to membrane proteins. More specifically, the invention relates to a method of magnetic alignment and two-dimensional crystallization of membrane proteins.

Membrane proteins are cell's primary mechanism for interacting with the external environment, and thus demonstrate exceptionally fine-tuned capabilities in sensing, selective transport, and catalysis. Three-dimensional (3D) structural models of membrane proteins are increasingly important in characterizing the molecular mechanisms of biological transport, sensing, and signal transduction systems, as well as in designing effective pharmacological agents.

Despite the importance of membrane proteins, they comprise only 2% of the protein structures in the Protein Data Bank. The critical bottleneck in determining structure-function relationships is the difficulty in expressing, purifying, and preparing membrane proteins for structural analysis. Electron crystallography of 2D crystals of membrane proteins in lipids is one technique for structure determination of membrane proteins in their native environment, but highly ordered 2D crystals are challenging to synthesize. For example, many methods of crystallizing membrane proteins use trial-and-error approaches, which are slow and expensive.

In addition, as perfectly monodisperse nanomaterials with unique transport, sensing, and catalytic properties, membrane proteins are also finding applications in engineered systems. Despite significant efforts to crystallize these membrane proteins into two-dimensional (2D) forms and incorporate these responsive nanomaterials in functional devices, the field suffers from an inability to predict and control the self-assembly of membrane proteins. As a result, an economically feasible manufacturing process for the 2D crystallization of a single membrane protein has not been developed.

Expanding the quality, efficiency, and scalability of techniques for 2D membrane protein crystallization will facilitate their structural analysis and application as responsive elements in functional devices. It would therefore be advantageous to develop a method of producing highly ordered two-dimensional membrane protein crystals.

BRIEF SUMMARY

According to one embodiment of the present invention, the application of external magnetic fields is used to facilitate long-range (size of crystal) and short-range (crystallinity) order in membrane protein (MP) crystallization. In some embodiments, block co-polymer (BCP) supports are used to support crystallization of the MP. By using a magnetic field, embodiments of the present invention exploit the diamagnetic anisotropy of MPs and engineered block co-polymer (BCP) supports to direct MP alignment and 2D crystallization.

Magnetic field alignment of materials is driven by anisotropy of magnetic susceptibility expressed coherently on a length scale sufficient to create a free energy difference between aligned and unaligned states that is significant with respect to thermal fluctuations (kT). The magnetic free energy difference scales as the product of the anisotropy of magnetic susceptibility and the magnetic field strength. Both alpha helical and beta barrel proteins, the dominant architectures of MPs, have strong diamagnetic anisotropy. The anisotropy of these MPs, which make up as much as 90% of the volume of the crystals, generally dominates the effect of magnetic fields on the orientation of 2D crystals. However in instances where MPs have low intrinsic diamagnetic anisotropy, BCPs with strong diamagnetic anisotropy may be employed to direct the self-assembly process.

The method according to certain embodiments will 1) significantly improve the quality of long-range and short-range order in 2D MP crystals; 2) significantly reduce the cost of the MP crystal fabrication process; 3) expand the scalability of the process by vastly expanding the number of MPs that can be realized as 2D crystals; and 4) translate 2D MP crystals into functional devices as membranes for separation in a microfluidics environment.

DETAILED DESCRIPTION

According to one embodiment, a membrane protein (MP) 101 is crystallized in the presence of a magnetic field. In further embodiments, a block co-polymer (BCP) 102 is used as a support structure to aid the alignment of the MP. When a BCP 102 is used, crystallization forms a MP-BCP platelet. The inherent diamagnetic anisotropy of either or both materials is exploited to improve the quality of the crystallized MP 101.

Exploiting the anisotropy of magnetic susceptibility at the molecular level improves long-range and short-range order observed in MP-BCP platelets that are formed in the presence of a magnetic field. All materials in a steady magnetic field have an induced magnetic moment, an intrinsic material property known as diamagnetism. The diamagnetic susceptibility (x) of a material with n atoms is given by Equation 1:

$$\chi = \frac{-nZ(\mu_0 e \langle r \rangle)^2}{6m_e} \quad (1)$$

where Z is the atomic number, $\mu_0$ is the magnetic permeability of free space, e is electron charge, me is electron mass and [r] is the root mean square orbital radius.

The magnetic susceptibility of large molecules like MPs 101 and BCPs 102 can be predicted by summation of diamagnetic susceptibilities (x) using a semi-empirical approach, known as the empirical increment system. The structural diamagnetic anisotropy ($\Delta\chi$) is related to the volume fractions and the difference of diamagnetic susceptibilities (x) of atoms or molecules aligned in parallel or perpendicular orientations to the applied field. Thus, for large proteins consisting of multiple components with different diamagnetic anisotropies, the sum of the parallel and perpendicular anisotropies of all components can be used to determine a net diamagnetic anisotropy, as expressed by Equation 2.

$$\Delta X = X_\parallel - X_\perp \quad (2)$$

Magnetic energy is given by Equation 3 below, where $\theta$ is the angle of parallel molecular orientation with respect to the magnetic field lines in a system. The difference in energy of the parallel and perpendicular orientations ($\Delta E$) in a magnetic field with uniform strength, B, is given by Equation 4. If $\Delta E$ exceeds the thermal energy (kT) of the system, the components of that system will orient in the energetically favorable configuration within the magnetic field.

$$E(\theta, B) = -B^2[(X_\parallel - X_\perp)\cos^2\theta + X_\perp]/2 \quad (3)$$

$$\Delta E = \frac{1}{2}B^2 \Delta \chi \quad (4)$$

For two-dimensional MP crystals 201, the magnetic alignment energy is an order of magnitude greater than the thermal energy, causing the normal of the crystal 201 to align with the magnetic field.

The diamagnetic anisotropy of MPs 101 is determined by both the aromatic side chains of amino acid residues and the peptide bonds connecting the residues. Aromatic residues, phenylalanine, tyrosine, and tryptophan, for example, align with the plane of the carbon ring parallel to the magnetic field. For MPs 101, such as outer membrane protein F (OmpF) and Aquaporin 0 (AQP0), approximately 10% of the residues in the protein 101 are aromatic and positioned parallel to the β-sheet.

The diamagnetic anisotropy of peptide bonds is influenced by the protein's secondary structure motif: β-sheet or α-helix. The preferred alignment of both the axis of an α-helix and the plane of a β-sheet is parallel to the magnetic field. In an α-helix the peptide bonds are orientated parallel to the axis of the helix and $\Delta\chi = 2.6 \times 10^{-6}$ per peptide. In a β-sheet, the peptide bond is orientated parallel to the plane of the sheet and $\Delta\chi = 1.3 \times 10^{-6}$ per peptide. The positions and number of aromatic residues and peptide bonds in a MP 101 determines the anisotropy and the direction of alignment. It is estimated OmpF and AQP0 have roughly 88% and 82% of their diamagnetic contributions oriented in the same preferred direction, respectively.

Figure 1A:
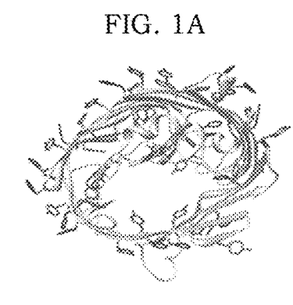
FIGS. 1A-1D are top and side views of three-dimensional structures of different membrane proteins.
Figure 1B:
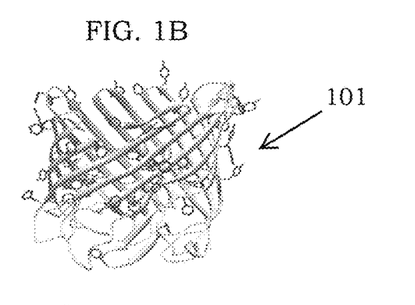
Figure 1C:
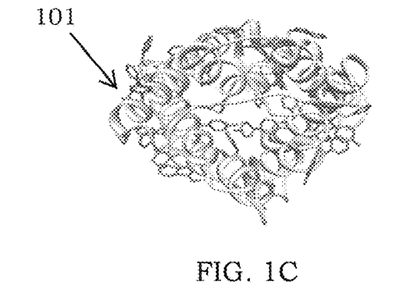
Figure 1D:
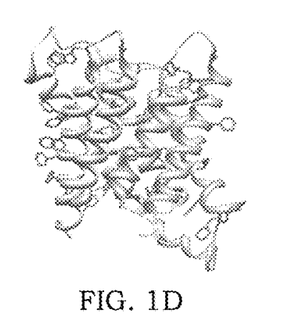

FIGS. 1A-1D shows illustrations of the OmpF and Aqp0 3D structures. FIG. 1A is a top view of the pore showing that the β-sheet and a majority of the aromatic residues (phenylalanine, tyrosine and tryptophan) are parallel to the pore in OmpF. FIG. 1B is a side view of the OmpF structure showing aromatic residues. FIG. 1C shows a top view of the Aqp0 3D structure, where the selective water pore is shown. A majority of the aromatic residues are within the pore or on the exterior of the protein structure and are parallel to the pore. FIG. 1D is a side view of Aqp0 structure with aromatic residues shown.

The dynamics of self-assembly and the ultimate orientation of 2D MP-BCP crystalline platelets in the presence of a magnetic field are also influenced by the diamagnetic anisotropy of the supporting BCPs 102. The alignment of BCPs 102 is a function of the diamagnetic anisotropy of the BCP 102, the mass fraction of BCP 102 in the final crystal structure 201, and the thermal fluctuations (kT) of the system. In one embodiment, the mass fraction of BCP 102 in a 2D MP crystal 201 will be less than 10%, indicating that $\Delta\chi$ of the BCP 102 will need to be significant in order to influence the self-assembly process. Nevertheless, it is possible that MPs 101 with exceedingly low diamagnetic anisotropy may be crystallized with the selection of a BCP 102 with high diamagnetic anisotropy.

Thus, (i) for MPs 101 with very low diamagnetic anisotropy, the method of one embodiment utilizes the diagmagnetic anisotropy of the BCP 102 to assist in directing the self-assembly of the supported MP 101 to create larger MP crystals 201; and (ii) for MPs 101 that exhibit diagmagnetic anisotropy, the rational selection of BCPs 102 that weakly compete with the diamagnetic anisotropy of the MP 101 will slow the crystallization process, creating more ordered crystals 201. That is, the use of BCPs 102 with different physiochemical properties than lipids cause MPs 101 to crystalize into larger unit cells.

Figure 2A:
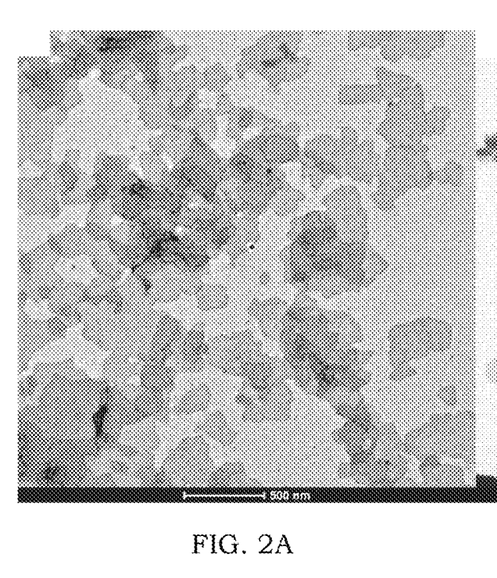
FIGS. 2A-2B are images of OmpF membrane proteins crystallized in the absence of a magnetic field and crystallized, according to one embodiment, in the presence of a magnetic field.
Figure 2B:
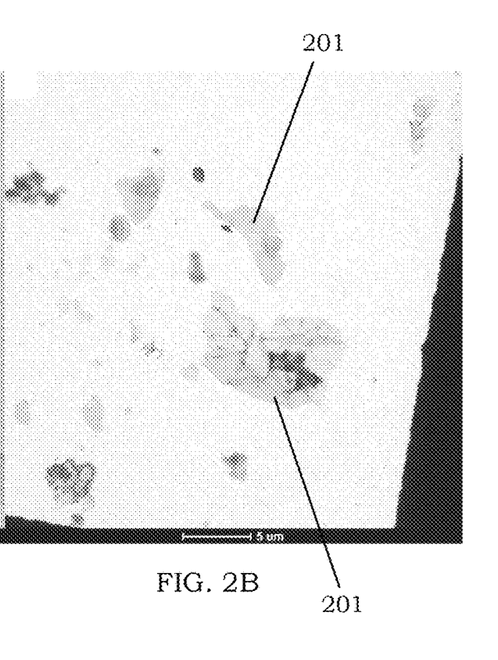

In one example embodiment of the method of the present invention, *Escherichia coli* OmpF used as the MP 101 is purified in its native trimeric state and stabilized in an n-Octylpolyoxyethylene (Octyl-POE) detergent solution before reconstitution. Polybutadience-polyethylene oxide (PB-PEO) is used as the BCP 102. Detergent removal via dialysis is used to induce crystallization into 2D crystals 201 in the presence of a 7.5 T magnetic field. The dialysis process is optimized to obtain a BCP-OmpF platelet (or crystal) 201 with higher ordering (up to six orders of diffraction spots). Referring to FIGS. 2A-2B, the drawings show OmpF crystallized in the absence of a magnetic field (FIG. 2A), and magnetically crystallized OmpF (FIG. 2B).

As compared to a dialysis only approach, a steady 7.5 T magnetic field applied during the detergent dialysis process led to an increase in the ordering of the BCP-OmpF crystals (FIG. 2B). Eight orders of diffraction spots, corresponding to a resolution of ~2.4 nm, were able to be visualized for the crystal 201 created in the presence of the magnetic field. The BCP-OmpF crystals 201 exhibited a hexagonal lattice type.

In another example embodiment, *E. coli* BL21(DE3) omp8 cells were grown in a 60 L fermentor in Luria-Bertani (LB) broth with 0.5% glycerol and 50 mg/L ampicillin using an agitation of 300 rpm. Cells were induced with 0.02 mM isopropyl β-D-thiogalactoside (IPTG) and the temperature was reduced to 16° C. for protein expression. About 1 kg of wet cells were harvested after 18 hours of growth and stored at −80° C. Frozen cells were suspended in 20 mM Tris pH 8.0 and 1 U/μL DNase at a concentration of 1 g cell pellet/10 mL buffer and lysed with a microfluidizer. Unbroken cells were spun down for 15 minutes at 4000 g. The broken cells were incubated with 1% SDS for 20 minutes and cell membranes were spun down for 60 minutes at 200,000 g, 4° C. Membranes were resuspended in 0.125% Octyl-POE, 20 mM sodium phosphate pH 7.4 using 5 mL buffer per 1 g cells and incubated for 60 minutes at 37° C., 250 rpm. Membranes were spun down for 60 minute at 200,000 g, 4° C. Extraction was completed by incubating resuspended membranes with 3% Octyl-POE in 20 mM phosphate buffer pH 7.4 (2 mL buffer per 1 g cell pellet) for 1 hour at 37° C., 250 rpm. Unsolubilized membranes were spun down for 30 minutes at 200,000 g, 4° C. The supernatant was applied to a HiScreen DEAF FF column and Superose 12 column. Size exclusion fractions were concentrated and quantified by the Bradford assay.

Next, Polyethylethylene-b-polyethylene oxide BCPs 102 were synthesized using anionic polymerization. First, synthesis of 1,2 Polybutadiene was conducted in tetrahydrofuran using sec-butyl lithium as initiator at −65° C. Polymerization was terminated by addition of ethylene oxide yielding monohydroxyl-terminated polybutadiene. Polyethylene oxide growth was accomplished by converting the hydroxyl group to potassium alkoxide, which was used as a macroinitiator. Polyethylethylene-b-polyethylene oxide BCPs 102 were then synthesized using a hydrogenation step to convert polybutadiene to polyethylethylene. Hydrogenation was performed using a high pressure Parr reactor and a palladium catalyst. The final BCP 102 composition was determined to be $PB_{12}$-$PEO_8$ with a polydispersity index of 1.18.

Finally, a crystallization buffer of 20 mM 4-(2-Hydroxyethyl)piperazin-1-ylethanesulphonic acid (HEPES), 10 mM $MgCl_2$, 100 mM NaCl, 0.2 mM DL-Dithiothreitol (DTT), and 3 mM $NaN_3$ was used to incubate 60 μL dialysis buttons. However, varying polymer to protein ratios (i.e. 0.1-1.0) can be used in alternative embodiments. Crystallization buffer with 4% Octyl-POE detergent was then added to bring each button to a final volume of 60 μL. The final protein concentration in each button was 1 mg/mL. They were then covered with a 12-14000 MWCO dialysis membrane and sealed with a rubber O-ring.

The samples were placed into 50 mL of buffer solution with a 4 wt % Octyl-POE concentration. The detergent concentration was halved every 24 hours by adding detergent free dialysis buffer. At an Ocytl-POE concentration of 0.25%, the samples were transferred into a homogeneous magnetic field from a horizontal-bore, Magnex Scientific, 7 Tesla (T), 21 cm, superconducting magnet with a passive iron shield field for 24 hours at room temperature in 50 mL of 0.25% Octyl-POE crystallization buffer. The buffer solution was then replaced with 50 mL of fresh buffer with no Octyl-POE, and left in the electromagnet for 24 additional hours. After application of the electromagnet, residual detergent was removed by dialysis in 1 L of dialysis buffer, which was renewed every 4 hours for 3 times.

Figure 3A:
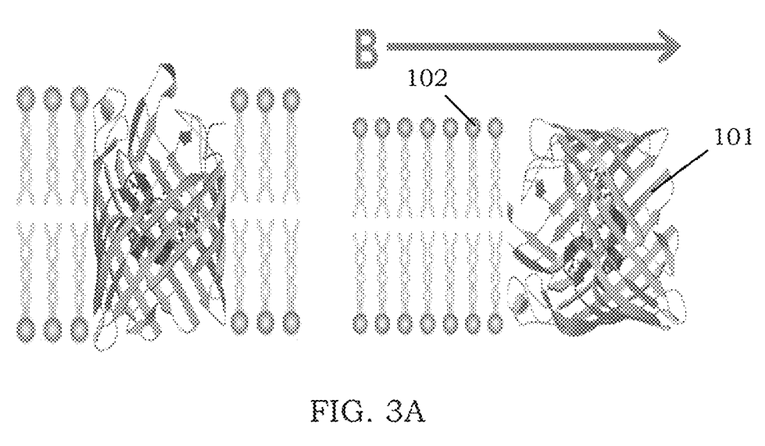
FIGS. 3A-3B are illustrations of magnetic alignment, according to one embodiment.
Figure 3B:
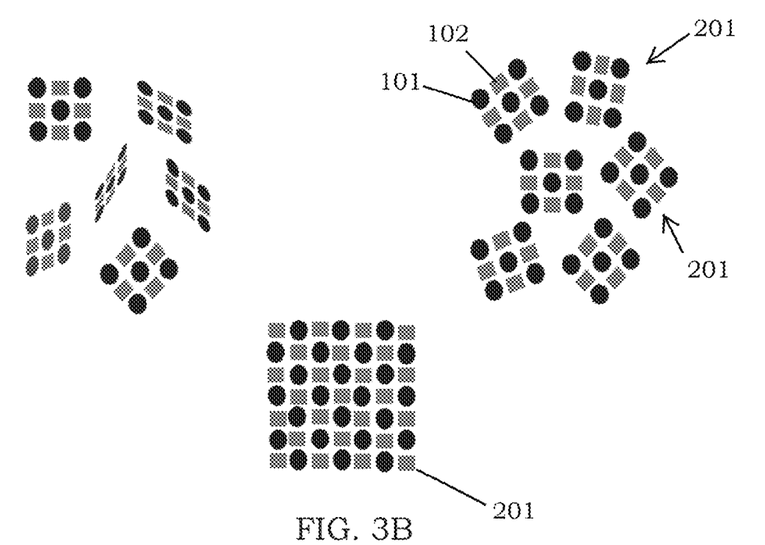

FIGS. 3A-3B are example illustrations where the magnetically assisted self-assembly of MP-BCP crystals 201 is accomplished at the molecular and platelet scales. In FIG. 3A, there is a diamagnetic susceptibility mismatch between the BCP 102 and the OmpF MP 101. This mismatch retards the self-assembly process and improves the short range order in the platelets 201 due to the deceleration of the crystallization process. As shown in the FIG. 3B, at low to moderate temperatures, intermolecular forces dominate over the mismatch in diamagnetic anisotropy, allowing for the formation of platelets 201. These platelets 201 align perpendicularly to the magnetic field due to the strong diamagnetic anisotropy of the MPs 101 and their larger mass fraction in the system. The perpendicular orientation of the platelets 201 assists in the formation of larger crystals 201 without any thermal annealing, though, in alternative embodiments, annealing the MP-BCP crystals 201 at temperatures below the protein denaturation temperature will further improve the long-range and short-range order of the crystals 201.

Figure 4A:
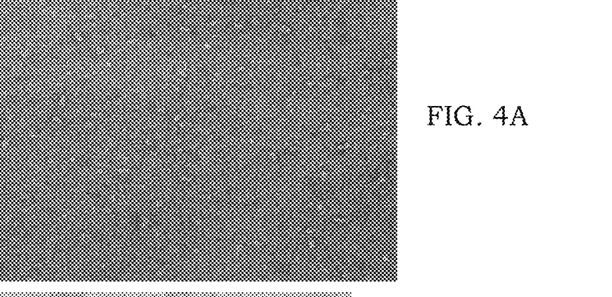
FIGS. 4A-4C are TEM images of uncrystallized and crystallized membrane proteins.
Figure 4B:
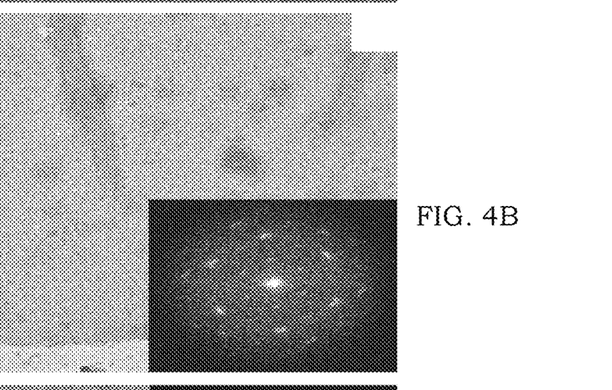
Figure 4C:
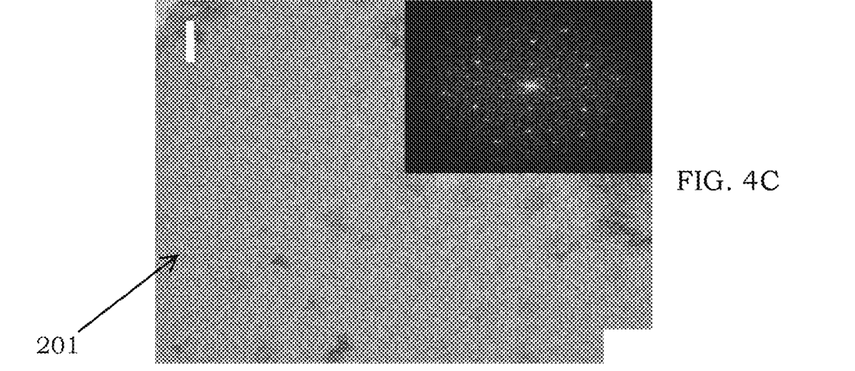

Referring again to the drawings, FIGS. 4A-4C compare representative TEM images of uncrystallized OmpF protein (FIG. 4A), crystallization of the MP 101 in the absence of a magnetic field (FIG. 4B), and crystallization in a 7.5 T magnetic field (FIG. 4C). The diffraction spots in the fast Fourier transform of each image (inset) shows a clear sharpening in diffraction spots in the MPs 101 exposed to a magnetic field, indicating a higher degree of crystalline order. In the example embodiment shown in FIG. 4C, trimeric OmpF proteins are solubilized in Octyl-POE detergent and then crystallized in PB-PEO-OH.

Figure 5:
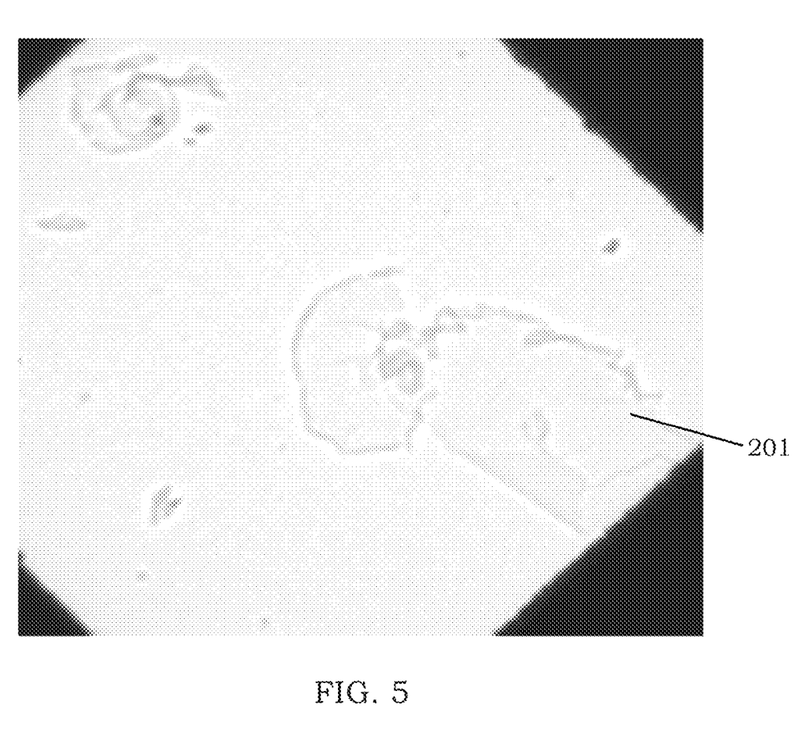
FIG. 5 is a TEM image of a membrane protein crystallized in a magnetic field, according to one embodiment.

Table 1 shows the average crystal size for crystals 201 aligned in the presence of a magnetic field, according to one embodiment, as compared to the average crystal size for unaligned crystals. Measurements were determined through analysis of a statistically valid set of TEM images using Image J software. Table 1 shows the average crystal size of the magnetically enhanced crystals 201 to be over twice the size of the control samples. The largest crystal 201 created under magnetic conditions was an order of magnitude higher than the largest control crystal. FIG. 5 is a TEM image of a MP crystal 201 created in the presence of a magnetic field, according to one embodiment.

| Avg Area ($\mu m^2$) | Max Area ($\mu m^2$) | Min Area ($\mu m^2$) |
|---|---|---|
| Aligned Crystal Summary (56 crystals) | | |
| 12.09 | 128.40 | 1.16 |
| Unaligned Crystal Summary (26 crystals) | | |
| 5.59 | 15.72 | 1.10 |

Predictive Modeling

In one embodiment, the process parameters for different MPs 101 and BCPs 102 are based on molecular simulation models. The models are simplified models that retain the essential physics as observed from experiment. The simulations, though simplified, provide a detailed probe of the kinetics and driving forces in the crystallization process.

In one embodiment, molecular coarse-grained modeling is used. A first simplification of this model is not to treat every atom in the system as structural a unit, but to treat each BCP 102 and MP 101 as a fixed structural unit that does not change its structure during the process. For the interactions between structural units, i.e., BCP-BCP, MP-MP, and BCP-MP, effective interactions are used that are a coarse-grained simplified representation of the atomic interactions.

A second, related, simplification is to use a mean-field-like model for the interactions with water. That is, since the water molecules are relatively small compared to BCPs 102 and MPs 101, the water is treated as simply a background polarizable continuum medium in which the particles are moving around. The effective background medium can be handled by simply renormalizing the effective interaction potentials and adding drag if necessary.

Upon making these simplifications, the interactions between BCP-BCP, BCP-MP, and MP-MP have three primary contributions: (i) short-range interactions that relate to bonding; (ii) van der Waals interactions, that can be treated through a standard inverse 6-th power of the distance dependence; and (iii) magnetic interactions between the BCP and MP, but also with the applied field.

For contributions (i) and (ii), there are a number of available coarse-grained potentials due to the importance of this system in numerous biological settings. The magnetic interactions (iii) follow the standard dipole interactions between particles, and they interact with the field through the relative orientation of the diamagnetic tensor to the applied field. That is, given the field M, the induced magnetic dipole vector m is proportional to the tensor product between the diamagnetic anisotropy tensor x and M. Since the molecules are roughly rod-like and the magnetically-relevant groups are roughly linear, to a reasonable approximation we can deduce the form of the diamagnetic tensor based on transverse isotropic symmetry, i.e. x must be symmetric in all directions normal to m.

$$X = X_\| mm - X_\perp (I - mm) \quad (5)$$

where mm represents the tensor (or outer) product between the vector m and itself. Note that though this is a seemingly simple linear dependence between M and m, it is nonlinear because x itself depends on m. The molecular dynamics simulations can be performed using software, such as the LAMMPS Molecular Dynamics Simulator. The modeling treats particles not just as points, but also provides them with orientation, an important feature because of diamagnetic anisotropy.

Functional Devices

Given the unique properties of MPs 101, functional devices 300 that incorporate MP crystals 201 can be fabricated for use in transport, sensing, and filtering applications, for example. In functional devices 300, the structure, packing density, and size of the MP platelet 201 facilitates device performance. In one embodiment, flat sheet geometry is used for convenient deployment. High MP crystal 201 packing density increases the functionality per unit area, while large MP platelets 201 simplify device fabrication and improve the selectivity of membranes formed from MP crystals 201.

Figure 6:
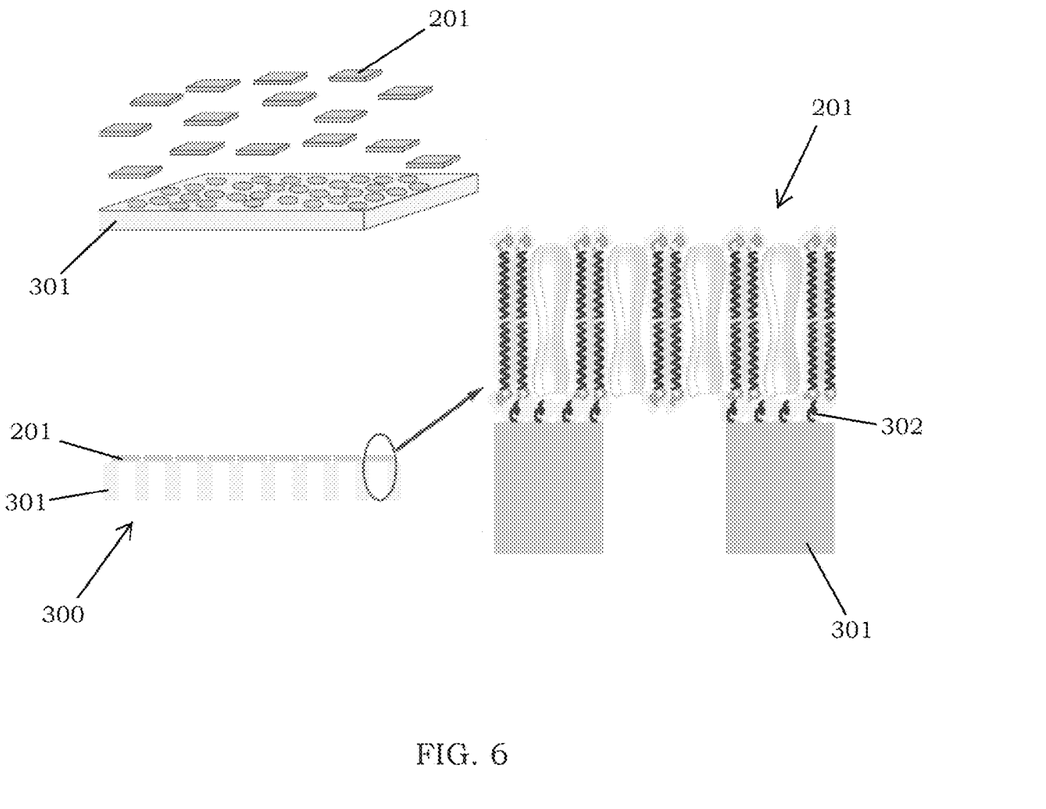
FIG. 6 is a function device incorporating magnetically aligned membrane proteins.

In one embodiment, a functional device 300 (i.e. a composite membrane) is fabricated via simple filtration deposition of MP crystals 201 onto a membrane support 301, as shown in FIG. 6. In this example embodiment, the support layer 301 comprises commercially available track etched membranes with average pore diameters of 15 nm. The pore size is significantly smaller (~100×) than the size of the platelets 201 that are produced by the methods described above. In this example, AqpO-based crystals 201 are deposited onto the support 301.

In order to have a leak free functional device, the end groups of the selected polymers that form the largest and most well-ordered crystals are functionalized to allow cross-linking on the complementarily functionalized microporous support layer 301. Succimidyl functionalization on the support is an example of a functionalization method to achieve covalent bonding between the deposited MP crystal 201 and the surface of the support 301 and thus, is used as bonding agent 302. Multiple layers of MP crystals 201 may be needed to provide complete coverage. In another example embodiment of a functional device 300, OmpF based membranes can be used as nanofiltration membranes for water purification and removal of large macromolecules, such as lactose and sucrose.

While the disclosure has been described in detail and with reference to specific embodiments thereof, it will be apparent to one skilled in the art that various changes and modification can be made therein without departing from the spirit and scope of the embodiments. Thus, it is intended that the present disclosure cover the modifications and variations of this disclosure provided they come within the scope of the appended claims and their equivalents.

What is claimed is:

1. A method of forming a two-dimensional membrane protein crystal comprising:
   providing a solution containing a membrane protein and a block co-polymer;
   exposing the solution to a magnetic field to facilitate alignment of the membrane protein in the solution; and
   forming a membrane protein crystal from the solution, wherein the membrane protein crystal is formed in the presence of the magnetic field.

2. The method of claim 1, wherein forming a membrane protein crystal from the solution comprises:
   concentrating the solution through dialysis.

3. The method of claim 1, wherein a strength of the magnetic field is based on a diamagnetic anisotropy of the membrane protein.

4. The method of claim 1, wherein a strength of the magnetic field is based on a diamagnetic anisotropy of the block co-polymer.

5. The method of claim 3 or 4, wherein the diamagnetic anisotropy is estimated from a molecular simulation model.

6. The method of claim 3 or 4, wherein the diamagnetic anisotropy is the sum of the diamagnetic anisotropy parallel to the magnetic field and the diamagnetic anisotropy perpendicular to the magnetic field.

7. The method of claim 1, wherein a difference between a magnetic energy parallel to the magnetic field and a magnetic energy perpendicular to the magnetic field is greater than a thermal energy of the solution.

8. The method of claim 1, wherein a mass fraction of the block co-polymer in the solution is less than 10%.

9. The method of claim 8, wherein a diamagnetic anisotropy of the block co-polymer is larger than a diamagnetic anisotropy of the membrane protein.

10. A product created from the process of claim 1.

11. A functional device incorporating a crystallized membrane protein comprising:
    a support layer having a plurality of pores;
    a membrane protein crystal formed in the presence of a magnetic field, wherein a diameter of the membrane protein crystal is larger than a diameter of the plurality of holes; and
    a bonding agent between the support layer and the membrane protein crystal.

12. The functional device of claim 11, wherein the bonding agent is a functionalized group on at least one of the support layer and the membrane protein crystal.

* * * * *